US007668971B2

(12) United States Patent
Vasseur et al.

(10) Patent No.: US 7,668,971 B2
(45) Date of Patent: Feb. 23, 2010

(54) DYNAMIC PATH COMPUTATION ELEMENT LOAD BALANCING WITH BACKUP PATH COMPUTATION ELEMENTS

(75) Inventors: Jean-Philippe Vasseur, Dunstable, MA (US); Abhay Kumar Roy, Cupertino, CA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 12/013,096

(22) Filed: Jan. 11, 2008

(65) Prior Publication Data

US 2009/0182894 A1 Jul. 16, 2009

(51) Int. Cl.
G06F 15/173 (2006.01)

(52) U.S. Cl. .............. 709/238; 709/239; 709/224; 709/249; 718/105; 370/351

(58) Field of Classification Search ......... 709/238–242, 709/249, 223–224; 718/105; 370/351, 353, 370/401, 238
See application file for complete search history.

(56) References Cited

U.S. PATENT DOCUMENTS

| 6,098,107 | A * | 8/2000 | Narvaez-Guarnieri et al. .... 709/239 |
| 6,434,612 | B1 | 8/2002 | Hughes et al. |
| 6,775,292 | B1 | 8/2004 | Kothapally |
| 7,031,262 | B2 | 4/2006 | Vasseur et al. |
| 7,142,558 | B1 | 11/2006 | Pack et al. |
| 7,180,864 | B2 * | 2/2007 | Basu et al. ................... 370/238 |
| 7,593,340 | B2 * | 9/2009 | Li et al. ...................... 709/238 |
| 2005/0259664 | A1 | 11/2005 | Vasseur et al. |
| 2006/0039391 | A1 | 2/2006 | Vasseur et al. |
| 2006/0104199 | A1 | 5/2006 | Katukam et al. |
| 2006/0171320 | A1 * | 8/2006 | Vasseur et al. .............. 370/351 |
| 2006/0209716 | A1 * | 9/2006 | Previdi et al. ............... 370/254 |
| 2007/0250713 | A1 * | 10/2007 | Rahman et al. ............. 713/171 |
| 2008/0069010 | A1 * | 3/2008 | Zhang ......................... 370/254 |
| 2008/0089227 | A1 * | 4/2008 | Guichard et al. ............ 370/228 |
| 2008/0091809 | A1 * | 4/2008 | Lee ............................ 709/223 |
| 2008/0151896 | A1 * | 6/2008 | Zhang ......................... 370/392 |
| 2008/0205271 | A1 * | 8/2008 | Aissaoui et al. ............. 370/235 |

OTHER PUBLICATIONS

Le Roux, et al., "OSPF Protocol Extensions for Path Computation Element (PCE) Discovery [draft-ietf-pce-disco-proto-ospf-08.txt]", Network Working Group, Internet Draft, Oct. 2007, 19 pages.

(Continued)

*Primary Examiner*—Philip B Tran
(74) *Attorney, Agent, or Firm*—Cesari and McKenna, LLP

(57) ABSTRACT

In one embodiment, a first path computation element (PCE) operates between first and second network domains, and is adapted to service requests from path computation clients (PCCs) in at least the first domain. In response to a backup event (e.g., failure of a second PCE), a backup PCE in the second domain may be informed of path computation information for the first domain used by the first PCE, and tunnels may be bi-directionally established between the first PCE and the backup PCE. Once the tunnels are established, the backup PCE may be advertised into the first domain, and the backup PCE may operate to load balance service requests for the first domain through the bi-directionally established tunnels.

20 Claims, 7 Drawing Sheets

OTHER PUBLICATIONS

Le Roux, et al., "IS-IS Protocol Extensions for Path Computation Element (PCE) Discovery [draft-ietf-pce-disco-proto-isis-08.txt]", Network Working Group, Internet Draft, Oct. 2007, 16 pages.

Vasseur, et al., "Path Computation Element (PCE) Communication Protocol (PCEP) [draft-ietf-pce-pcep-08.txt]", Network Working Group, Internet Draft, Jul. 2007, 68 pages.

* cited by examiner

PCEP (PCOL) MESSAGE 500

HEADER(S)
510

OTHER PCEP FIELDS
520

PCOL DATA
530

DOMAIN ID     532

PARAMETERS     534

OTHER DATA     536

DYNAMIC PATH COMPUTATION ELEMENT LOAD BALANCING WITH BACKUP PATH COMPUTATION ELEMENTS

TECHNICAL FIELD

The present disclosure relates generally to computer networks, and, more particularly, to path computation elements (PCEs) and backup PCEs.

BACKGROUND

Path Computation Elements (PCEs) may be used for computation of paths in numerous advantageous situations, such as inter-domain (Autonomous Systems/Area or AS/area) path computation. For example, in conjunction with Multi-Protocol Label Switching Traffic Engineering (MPLS TE), PCEs may be used to compute shortest constrained paths across domains (e.g., for tunnels), diverse paths, etc. One concern with such an architecture is that the PCE becomes a critical component, and its failure and performance have a direct impact on the rerouting times of tunnels that use the PCE for their path computation. This is particularly critical because inter-domain tunnels (e.g., TE-LSPs or Label Switched Paths) are typically used to carry highly critical traffic (e.g., voice traffic, special Virtual Private Network or "VPN" traffic, all traffic, etc.). Accordingly, it is increasingly important to consider PCE failure and response time when designing and implementing a computer network.

Generally, PCE functions are hosted on a border router (BR) between domains, and there are typically at least two BRs, so there is no single point of failure. Mechanisms have been designed so as to quickly redirect the traffic toward/onto other BRs/PCEs in the event of a failure of another BR/PCE. One problem associated with this, however, is that the response time of the BR/PCE receiving the redirected traffic may be directly affected because the receiving PCE may now receive path computation requests from all Path Computation Clients (PCCs) in the domains originally utilizing the failed PCE (e.g., also requests from PCCs of other/remote domains with tunnels terminating/traversing in the failed PCE's domain). Often, too, path computation requests occur in bursts, such as after a network element (node/link) failure, which can affect hundreds or thousands of tunnels.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
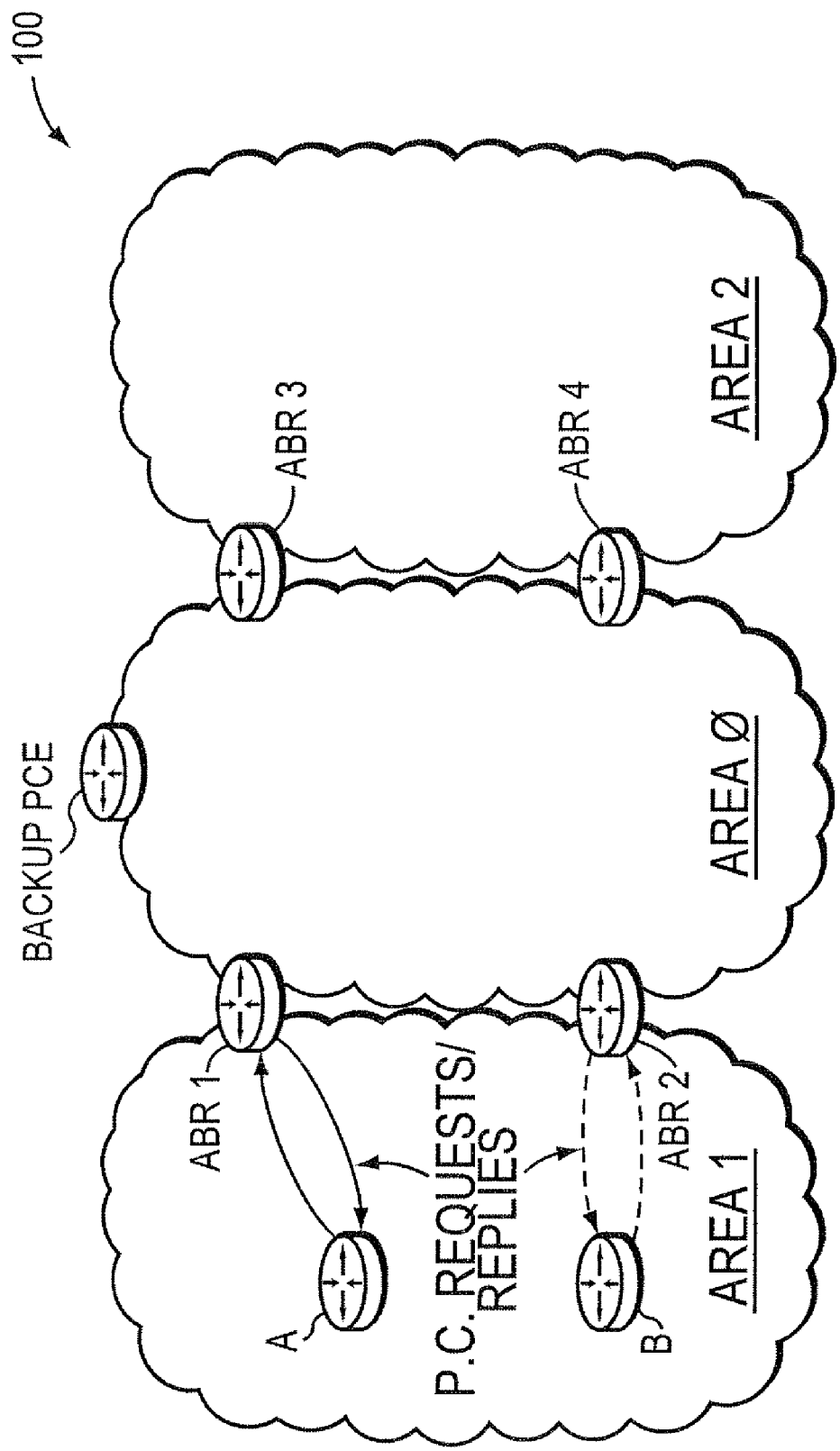
FIG. 1 illustrates an example computer network.

According to embodiments of the disclosure, a first path computation element (PCE) operates between first and second network domains, and is adapted to service requests from path computation clients (PCCs) in at least the first domain. In response to a backup event (e.g., failure of a second PCE), a backup PCE in the second domain may be informed of path computation information for the first domain used by the first PCE, and tunnels may be bi-directionally established between the first PCE and the backup PCE. Once the tunnels are established, the backup PCE may be advertised into the first domain, and the backup PCE may operate to load balance service requests for the first domain through the bi-directionally established tunnels.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR.

FIG. 1 is a schematic block diagram of an example computer network 100 illustratively comprising a plurality of domains (e.g., areas) interconnected by BRs. For example, the domains may illustratively be areas, such as Area 0 (e.g., a backbone area) interconnecting Areas 1 and 2 through area border routers (ABRs) ABR1-2 and ABR3-4, respectively. Within the areas may be other nodes/routers and links, as will be understood by those skilled in the art, such as routers A and B in Area 1. As described herein a "backup PCE" may also be present within one of the domains, for instance, in Area 0 as shown. Those skilled in the art will also understand that any number of nodes, devices, links, etc. may be used in the computer network. The view shown herein is merely illustrative and is used for simplicity. Those skilled in the art will further understand that while the embodiments set forth herein are described with domains in relation to areas, these embodiments may apply to any network configuration, such as for ASes, or other domains.

Data packets/traffic may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
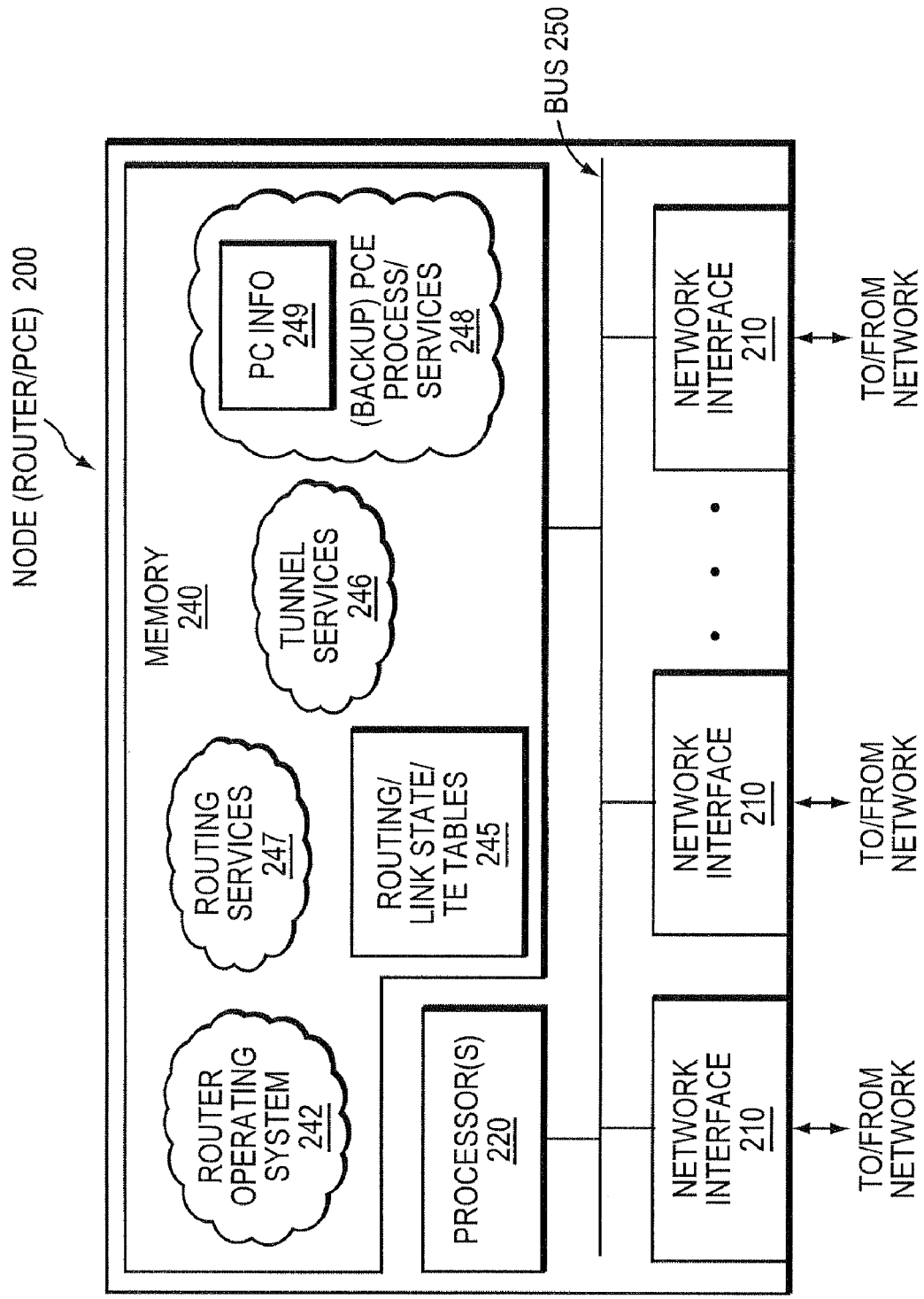
FIG. 2 illustrates an example network device/node.

FIG. 2 is a schematic block diagram of an example node/router 200 that may be advantageously used with one or more embodiments described herein, e.g., as a path computation element or client (PCE or PCC). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as routing databases/link state data bases (LSDB)/Traffic Engineering databases (TED) and or tables 245. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, tunneling process/services 246, and PCE (and/or "backup PCE") process/services 248. It will be apparent to those skilled in the art that other processor and memories, including various computer-readable media, may be used to store and execute program instructions pertaining to the inventive technique described herein.

Routing services 247 contain computer executable instructions executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables 245 containing, e.g., data used to make routing and forwarding decisions. Notably, routing services 247 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 247, for example, IGP services such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (not shown) stores the FEC, the next-hop information for the LSP, and the label required by the next hop.

Also, MPLS Traffic Engineering (TE) has been developed to meet data networking requirements such as guaranteed available bandwidth or fast reroute/restoration (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), IP tunnels, and generic routing encapsulation (GRE) tunnels.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not (generally) co-located on the head-end node. Various path computation methodologies are available including CSPF (constrained shortest path first).

The PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services. Example IGP-based PCEDs are described in Internet Drafts entitled "OSPF Protocol Extensions for Path Computation Element (PCE) Discovery"<draft-ietf-pce-disco-proto-ospf-08> and "IS-IS Protocol Extensions for Path Computation Element (PCE) Discovery"<draft-ietf-pce-disco-proto-isis-08>.

Figure 3:
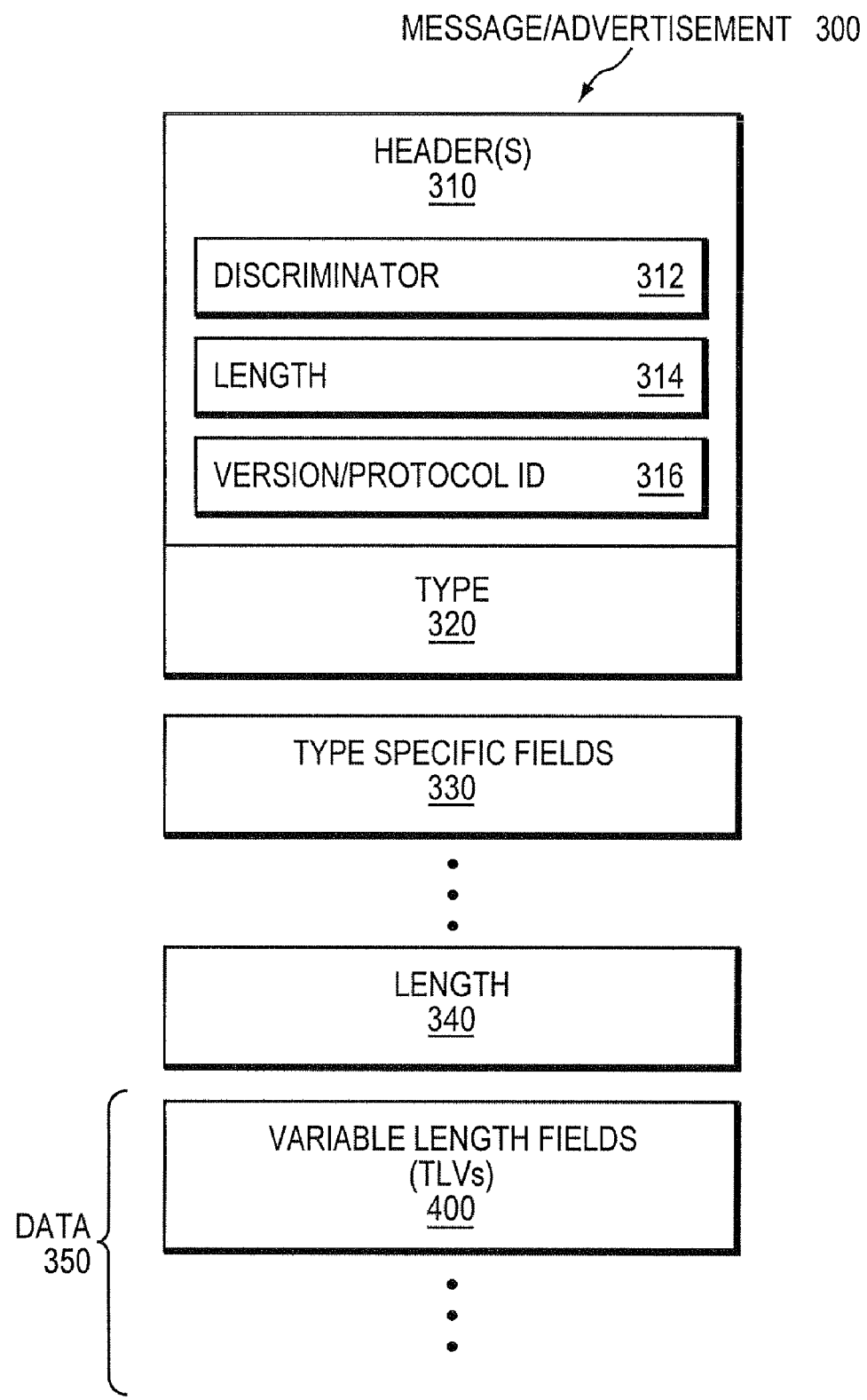
FIG. 3 illustrates an example message/advertisement.

FIG. 3 illustrates an example message/advertisement 300 that may be flooded/sent by the routers 200, such as an IGP advertisement or other message in accordance with the embodiments described herein. Illustratively, the advertisement/message 300 is shown as a generic packet. Those skilled in the art will understand, however, that particular protocols may have fields not specifically shown that may be used in accordance with the one or more embodiments described herein. The message 300 includes one or more headers 310, having a plurality of fields, one of which is used to identify the message/advertisement, e.g., an intra-domain routing protocol discriminator field 312 that identifies the specific protocol of the message (e.g., IS-IS, OSPF, LDP, etc.), and another of which is a length indicator field 314 that stores a value indicating the length of the standard header for the advertisement/message. Other fields, such as version/protocol ID extension fields 316 may be used to store a value defining the particular version of the protocol.

A type field 320 stores a value indicating the type (and version) of advertisement/message 300 being transmitted, which may define the existence of other type-specific fields 330 within the message. For example, the type of advertisement for an IGP message may be a link state packet, a "Hello" packet, etc., while types for an LDP packet may be a withdraw message, a release message, etc., as will be understood by those skilled in the art. The other type-specific fields 330 may include any number of fields as defined by the protocol, such as source ID fields, checksum fields, maximum area address fields, etc., as understood by those skilled in the art. The length field 340 stores a value indicating the length of the entire message 300, including the header, type-specific fields, and data fields.

The data section 350 includes one or more variable length fields 400, which each have a specific type (or code), length, and value (TLV) as described further herein. For example, to advertise network topology for IGP advertisements, one or more pairs of neighboring-node fields (not shown) and cost fields (not shown) may be used. Alternatively, to advertise PCEs (e.g., for PCED), other specific fields may be used (not shown).

In particular, the TLV encoded format is used to identify a type (T) of information being communicated (conveyed), a length (L) of information to be conveyed, and a value (V) of the actual information conveyed (e.g., interpreted based on the type (T) of information). The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
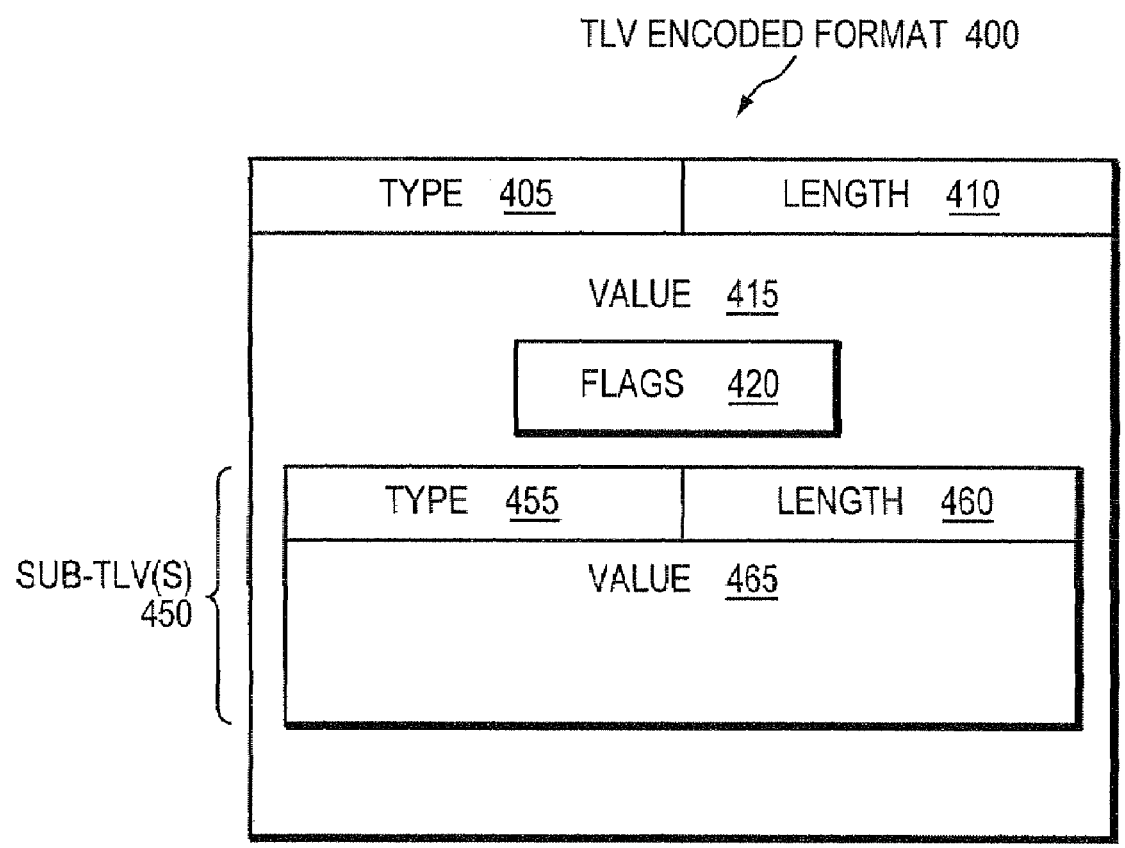
FIG. 4 illustrates an example encoded format (TLV)

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners in messages/advertisements 300 according to the embodiments described herein, including one or more novel manners described herein.

Generally, PCE functions are hosted on a BR between domains, and there are typically at least two BRs, so there is no single point of failure. For example, ABRs 1 and 2 of Area 1/0 may each be PCEs, as are ABRs 3 and 4 of Area 2/0. Illustratively, ABRs 1 and 2 are adapted to service requests from PCCs in their domain(s), such as from routers A and B. For example, through various load-balancing techniques that may be understood by those skilled in the art, router A may send requests to ABR/PCE 1, while router B may send requests to ABR/PCE 2 (e.g., as shown in FIG. 1 by arrows between routers and PCEs, accordingly). Note that while illustratively, PCE functions are generally hosted on a BR, the techniques described herein are equally applicable to PCEs not hosted on a BR, accordingly.

As noted, one concern with using PCEs is that the PCE becomes a critical component, and its failure and performance have a direct impact on the rerouting times of tunnels that use the PCE for their path computation. For example, where traffic may be quickly redirected from a failed PCE to an operating PCE, the response time of the receiving PCE may be directly affected due to an increase in requests from PCCs. Alternatively, where only one PCE is available to a domain, this PCE may become overburdened by requests, particularly where the requests occur in burst mode due to a network element failure that requires re-computation of large numbers of tunnels. In any of these situations (and others), it has generally been difficult to maintain an acceptable level of performance/response time without expensive and/or cumbersome techniques (e.g., manually adding an additional PCE to each domain, such as a third ABR/PCE for each of Areas 1 and 2 up to n areas attached to the backbone Area 0).

Dynamic PCE Load Balancing

According to embodiments of the disclosure, a first PCE (e.g., ABR 1) operates between a first and second network domain (e.g., Areas 1 and 0), and is adapted to service requests from PCCs in at least the first domains (e.g., router A). In response to a backup event (e.g., failure of a second PCE, ABR 2), a backup PCE in the second domain may be informed of path computation information for the first domain used by the first PCE, and tunnels may be bi-directionally established between the first PCE and the backup PCE. Once the tunnels are established, the backup PCE may be advertised into the first domain, thus appearing as a local PCE for the nodes in the first domain, and the backup PCE may operate to load balance service requests for the first domain through the bi-directionally established tunnels.

In an illustrative embodiment, PCE process 248 (and backup PCE process 248) may operate to perform functions relating to the novel techniques described herein to provide for dynamic PCE load balancing, for instance, using a backup PCE for failure situations as well as for non-failure related load balancing purposes.

Operationally, the PCEs (e.g., ABR 1 and ABR 2, illustratively) may learn of the backup PCE in the second domain (Area 0), for instance, through a PCED message 300. For example, a new flag 420 of an existing PCED TLV 400, or a new TLV 400 may be defined that is carried within the PCED message (e.g., as a sub-TLV 450 of a PCED TLV 400 of an OSPF Router Information LSA 300, or IS-IS Router Capability message 300). The purpose of this new TLV 400 (sub-TLV 450) is to allow the backup PCE to announce/advertise itself as a backup PCE. Notably, one (or more) backup PCE(s) may be used as a backup for all PCEs of the network 100 (e.g., for all areas or domains of an AS), as opposed to a backup PCE for each domain (e.g., each area). The backup PCE may be located within the backbone area (Area 0) as a centralized/dedicated backup PCE whose primary purpose is to backup PCEs, or the backup PCE may be another BR (e.g., an ABR "5" to an Area "3", not shown). In the event more than one backup PCE exists within a network (that is, more than one backup PCE advertisement may be received by PCEs of the network 100), then PCED message 300 may be configured with preference values or other methods of distributing backup duties to multiple backup PCEs (e.g., processing capacity, wait times, etc.).

According to one or more embodiments described herein, the first and second PCEs monitor each other for failure as part of the backup techniques herein, such as in response to learning of a backup PCE. The first and second PCEs may monitor each other using conventional routing procedures (e.g., "hello" messages), or through other techniques that may be more appropriate in given circumstances, such as fast failure detection through Bi-directional Forwarding Detection (BFD) messages, etc. A failure, therefore, may be detected by a lack of response from the other PCE (of the first and second PCEs). This failure, in turn, may generate a "backup event", such that the surviving PCE initializes the backup PCE for load balancing as described herein (e.g., after a configured timer to ensure that the failure/event is non-transient). Note that while one example of a backup event is a failure of a second PCE, other backup events may be used in accordance with one or more embodiments described herein. For example, a burst of requests received at a PCE may be cause for a backup event (e.g., an overloaded PCE), as well as learning of the backup PCE itself (such as, e.g., where the learning PCE has insufficient load-balancing PCE partners). In other words, while illustrative embodiments are described herein with relation to a failed second PCE, other situations may benefit from the dynamic backup techniques described herein. For example, the techniques may be used where certain BRs are not configured as PCEs, and such techniques may off-load PCE functionality onto other BRs that do support PCE functions (e.g., backup PCEs, such as ABR "5").

Figure 5:
FIG. 5 illustrates an example message (PCEP)

The PCE detecting the backup event (e.g., the first and/or remaining PCE, such as ABR 1) initializes the backup PCE by informing the backup PCE of path computation information for the first domain used by the first PCE. For example, a protocol that may be used to communicate between PCEs is the PCE Protocol or "PCEP", such as defined in the Internet Draft entitled "Path Computation Element (PCE) communication Protocol (PCEP)"<draft-ietf-pce-pcep-08>. FIG. 5 illustrates an example PCEP message 500 that may be sent by the PCEs (between PCE process 248 of routers 200) in accordance with the embodiments described herein. Illustratively, the message 500 is shown as a generic message, comprising one or more headers 510, having a plurality of fields, such as to identify the source/destination, the type of message, etc. Those skilled in the art will understand, however, that particular fields not specifically shown may be used in accordance with the one or more embodiments described herein, and such fields are generically indicated as "other PCEP fields" 520.

In accordance with a newly defined PCEP message 500, a "PCOL: PCE Off-Load" data field 530 may be included within the message 500, which may be sent by the first/surviving PCE to the backup PCE to carry the path computation information, accordingly. For instance, the PCOL field 530 may comprise a domain identification (ID) field 532, such as for a specific area number (of the first domain) in case the backup PCE is not connected to that (first) domain. Also, the PCOL field 530 may comprise a parameters field 534, which may relay information such as routing adjacency timers (optional) or other parameters to allow the backup PCE to act/appear as though it were a part of the first domain. Other information/data may also be contained within field 536. Note that the first PCE may populate the PCOL fields in accordance with its stored path computation information 249.

Figure 6:
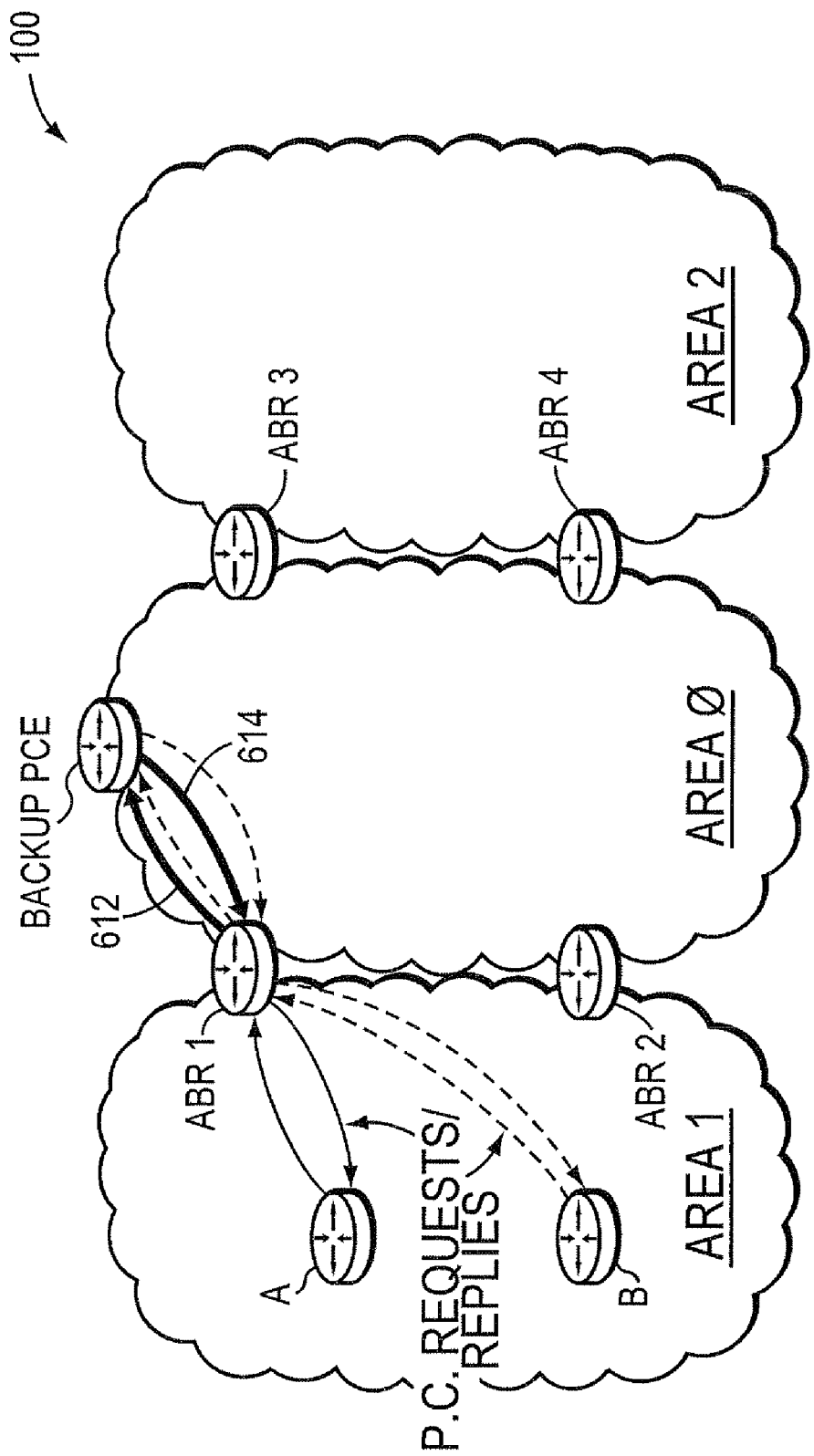
FIG. 6 illustrates an example computer network.

Once the backup PCE is informed of the path computation information (and, thus, of the need/request for its backup services for a particular domain through a particular first PCE), the first PCE and backup PCE may bi-directionally establish tunnels between each other. In other words, the first PCE may establish a uni-directional tunnel (e.g., a GRE tunnel) to the backup PCE, while the backup PCE may establish a uni-directional tunnel to the first PCE. For example, FIG. 6 illustrates an example network 100 as shown in FIG. 1 with bi-directionally established tunnels 612 and 614 between the first and backup PCEs. As such, both PCEs (first and backup) may start/establish a routing adjacency over the tunnels, and databases (LSDBs/TEDs) 245 may synchronized between the PCEs. Notably, informing the backup PCE of the path computation information as mentioned above may include the exchange of databases 245 in the PCOL message 500, or, illustratively, through conventional route synchronization techniques to exchange the information over the routing adjacency as just mentioned.

Upon initializing the backup PCE with the path computation information of the first PCE, the backup PCE may be advertised/announced into the first domain for use as a PCE. For instance, the newly formed adjacency between the first PCE and backup PCE may be announced as new link in the first domain, such that the PCCs in the first domain (e.g., router A and B) may determine a path to reach the backup PCE that is "within" their domain. It is important to note, however, that non-PCC-request traffic should be prevented from utilizing the bi-directionally established tunnels (i.e., the new "link" of the first domain). In particular, as may be appreciated by those skilled in the art, the new link hides the underlying tunnel that traverses a first ABR into another domain. Should non-request traffic begin to use the backup PCE as a second ABR into the second domain, various routing procedures may be broken. That is, the first primary-backup PCE link should be announced into the first domain with a high cost value to avoid routers in first domain from including the backup PCE for inter-domain transit. Also, a route filtering mechanism should be activated on the backup PCE to prevent it from announcing any of the first domain's internal routes (e.g., the path computation information) into its locally attached domains (e.g. the backbone/second domain). In particular, routers from the second domain should not use the backup PCE for inter-domain transit back to the first domain, either.

Since the backup PCE has been announced into the first domain as a new PCE operating on behalf of the first domain, the PCCs (e.g., routers A and B) may begin to send requests to the first and backup PCEs to load-balance their requests. For example, using known load-balancing techniques, the PCCs of the first domain may send their requests to either (or both) of the available PCEs to service the requests, thus providing response times substantially equivalent to those occurring before the failure (e.g., again with two PCEs), or better response times if the backup PCE is in place without a failure (e.g., now with an additional PCE to utilize).

Note that, as shown in FIG. 6, the path for (load-balanced) path computation requests are i) from router/PCC A to the first PCE (ABR 1), and ii) from router/PCC B to the backup PCE through the first PCE, i.e., B->ABR 1->backup PCE. Accordingly, however, the first PCE does not process any requests sent to the backup PCE, but merely forwards the requests on to the backup PCE on the tunnels (adjacency) as though it were any other node along the path to the backup PCE. As mentioned above, this is why mechanisms should be put in place to prevent other, non-request traffic from utilizing the tunnels/adjacency, since the adjacency between the first PCE and the backup PCE appear as a conventional link, as will be appreciated by those skilled in the art.

Moreover, in the event the first PCE determines that the second PCE has recovered (e.g., after another configured timer to ensure that the recovery is not temporary), the first PCE may notify the backup PCE that the second PCE has resumed operation, at which time the backup PCE may discontinue its operation for the first domain (e.g., after having processed all the pending requests). Also, at this time, the first PCE and the backup PCE may tear down their routing adjacency and corresponding tunnels to free up network resources.

Figure 7:
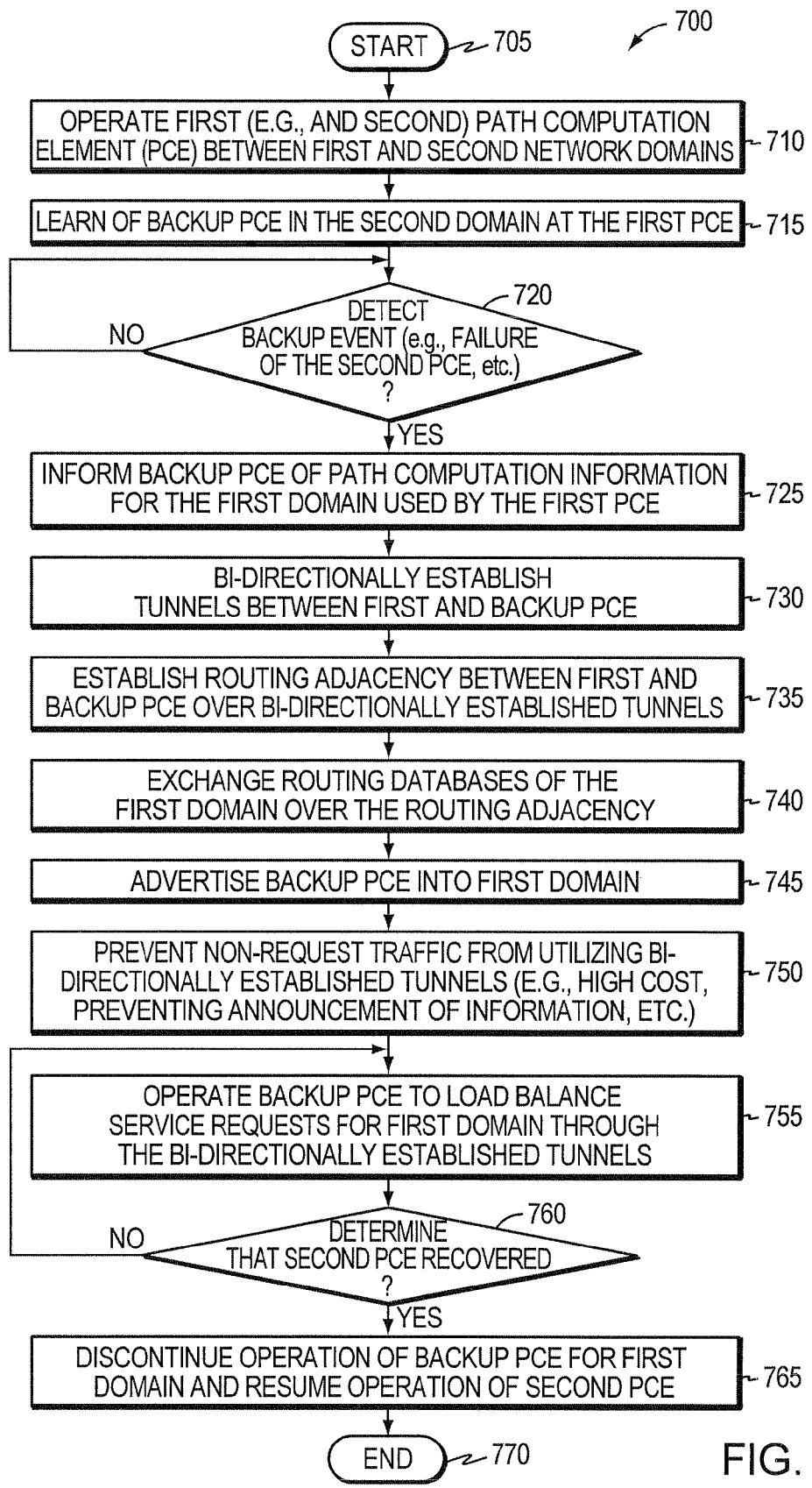
FIG. 7 illustrates an example procedure for dynamic PCE load-balancing.

FIG. 7 illustrates an example procedure for dynamically load balancing PCEs in accordance with one or more embodiments described herein. The procedure 700 starts at step 705, and continues to step 710, where a first (e.g., and second) PCE is/are operating (PCE process 248) between first and second network domains (e.g., ABR1 and ABR2 between domains 1 and 0). In step 715, the PCEs may learn of a backup PCE in the second domain (0) in step 715, such as through IGP messages 300 above. As described above, the first PCE may detect a backup event in step 720, such as a failure of the second PCE (i.e., by monitoring the second PCE), the learning in step 715, etc. If there is no detected event, the PCE(s) continue to operate (as in step 710) until an event occurs (step 720).

If, however, the first PCE does detect a backup event in step 720, the procedure 700 continues to step 725 where the first PCE informs the backup PCE (backup PCE process 248) of the path computation information for the first domain (1) used by the first PCE (e.g., information 249). For instance, as mentioned above, a PCEP message 500 with PCOL fields 530 may be used to carry the information, or, as in the following steps (particularly, 740), the information may arrive at the backup PCE in stages.

Once the PCEP message 500 with PCOL fields 530 has been transmitted to the backup PCE, tunnels may be bi-directionally established between first and backup PCEs in step 730, such as a GRE tunnel in each direction. Accordingly, a routing adjacency may be established in step 735 between first and backup PCEs over the bi-directionally established tunnels, and routing databases of the first domain (e.g., LSDBs/TEDs 245, etc.) may be exchanged over the routing adjacency in step 740. The first PCE also advertises the backup PCE into first domain in step 745, e.g., by generating its own advertisement or, illustratively, by forwarding an advertisement generated by the backup PCE and sent over the tunnels. Notably, as mentioned above, care must be taken to prevent non-request traffic from utilizing bi-directionally established tunnels, such as by setting a high cost, preventing announcement of information over the adjacency, etc., as illustrated in step 750.

After notifying the backup PCE and exchanging path computation information, the backup PCE may operate in step 755 to load balance service requests for the first domain through the bi-directionally established tunnels. That is, PCCs in the first domain (e.g., A and B) may learn of the backup PCE, and may load balance requests to the first PCE and backup PCE (notably, to the backup PCE through the first PCE unprocessed). If the backup event in step 720 was a failed second PCE, the first and/or backup PCE may determine in step 760 that the second PCE has recovered. If so, then in step 765 the operation of the backup PCE may be discontinued (for the first domain) and operation of second PCE may resume accordingly. The procedure 700 may then end in step 770 (notably, continuing to operate the first and second PCEs or the first and backup PCEs, though not explicitly shown).

Advantageously, the novel techniques described herein dynamically load balance requests across PCEs in a computer network. By providing mechanisms to dynamically discover and utilize one or more backup PCEs, the novel techniques may maintain substantially equivalent performance for response time in case of a failure of load-balanced PCE, and also provide for an additional PCE for load balancing. In particular, the techniques described above dynamically extend the network domain scope to include a PCE of another domain, where mechanisms are utilized in order to avoid using that PCE as an ABR (i.e., preventing conventional traffic use). Further, dynamic aspects of one or more embodiments described herein alleviate the need for cumbersome and inefficient manual configuration.

While there have been shown and described illustrative embodiments that dynamically load balance PCEs in a computer network, it is to be understood that various other adaptations and modifications may be made within the spirit and scope of the pre-sent invention. For example, the embodiments have been shown and described herein using particular protocols and particular messages/fields within those protocols. However, the embodiments of the invention in their broader sense are not so limited, and may, in fact, be used with other suitable protocols not specifically mentioned herein, as will be appreciated by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   operating a first path computation element (PCE) between first and second network domains, the first PCE adapted to service requests from path computation clients (PCCs) in at least the first domain; and
   in response to a backup event:
   i) informing a backup PCE in the second domain of path computation information for the first domain used by the first PCE;
   ii) bi-directionally establishing tunnels between the first PCE and the backup PCE;
   iii) advertising the backup PCE into the first domain; and
   iv) operating the backup PCE to load balance service requests for the first domain through the bi-directionally established tunnels.

2. The method as in claim 1, further comprising:
   learning of the backup PCE in the second domain at the first PCE.

3. The method as in claim 1, further comprising:
   operating a second PCE adapted to service requests from PCCs in at least the first domain.

4. The method as in claim 3, further comprising:
   detecting a backup event in response to failure of the second PCE.

5. The method as in claim 4, further comprising:
   determining that the second PCE has recovered; and in response,
   discontinuing operation of the backup PCE for the first domain; and also
   resuming operation of the second PCE for the first domain.

6. The method as in claim 1, further comprising:
   detecting a backup event in response to a burst of requests.

7. The method as in claim 1, further comprising:
   detecting a backup event in response to learning of the backup PCE.

8. The method as in claim 1, further comprising:
   establishing a routing adjacency between the first PCE and backup PCE over the bi-directionally established tunnels.

9. The method as in claim 8, wherein informing the backup PCE of path computation information for the first domain used by the first PCE further comprises:
   exchanging routing databases of the first domain over the routing adjacency.

10. The method as in claim 1, further comprising:
    preventing non-request traffic from utilizing the bi-directionally established tunnels.

11. The method as in claim 10, wherein preventing further comprises:
    applying a high cost to the bi-directionally established tunnels for non-request traffic use.

12. The method as in claim 1, further comprising:
    preventing the backup PCE from announcing any path computation information for the first domain into the second domain.

13. The method as in claim 1, wherein the second domain is a backbone area.

14. An apparatus, comprising:
    one or more network interfaces adapted to communicate with first and second network domains and receive requests from path computation clients (PCCs) in at least the first domain;
    one or more processors coupled to the network interfaces and adapted to execute one or more processes; and
    a memory adapted to store a path computation element (PCE) process executable by each processor, the PCE process when executed operable to compute paths for PCCs, and, in response to a backup event: i) inform a backup PCE in the second domain of path computation information for the first domain used by the node; ii) bi-directionally establish tunnels between the apparatus and the backup PCE; iii) advertise the backup PCE into the first domain; and iv) load balance service requests for the first domain with the backup PCE through the bi-directionally established tunnels.

15. The apparatus as in claim 14, wherein the PCE process when executed is further operable to:
    learn of the backup PCE in the second domain.

16. The apparatus as in claim 14, wherein the PCE process when executed is further operable to:
    detect a backup event in response to failure of a second PCE adapted to service requests from PCCs in at least the first domain.

17. The apparatus as in claim 14, wherein the PCE process when executed is further operable to:
    establish a routing adjacency between the apparatus and the backup PCE over the bi-directionally established tunnels.

18. The apparatus as in claim 14, wherein the PCE process when executed is further operable to:
    prevent non-request traffic from utilizing the bi-directionally established tunnels.

19. An apparatus, comprising:
    one or more network interfaces adapted to communicate with a second network domain and a first PCE in communication with a first network domain and the second domain, the first PCE adapted to receive requests from path computation clients (PCCs) in at least the first domain;
    one or more processors coupled to the network interfaces and adapted to execute one or more processes; and
    a memory adapted to store a backup path computation element (PCE) process executable by each processor, the backup PCE process when executed operable to compute paths for PCCs, and, in response to a backup event: i) receive path computation information for the first domain used by the first PCE; ii) bi-directionally establish tunnels between the apparatus and the first PCE; iii) advertise the backup PCE into the first domain; and iv) load balance service requests for the first domain with the first PCE through the bi-directionally established tunnels.

20. The apparatus as in claim 19, wherein the backup PCE process when executed is further operable to:
    prevent announcement of any path computation information for the first domain into the second domain.

* * * * *